United States Patent [19]

Franck

[11] Patent Number: 4,603,830
[45] Date of Patent: Aug. 5, 1986

[54] SPRING MOUNTING APPARATUS

[75] Inventor: Klaus Franck, Hanover, Fed. Rep. of Germany

[73] Assignee: Wilkhahn Wilkening and Hahne GmbH & Co., Bad Munder, Fed. Rep. of Germany

[21] Appl. No.: 648,477

[22] Filed: Sep. 10, 1984

[30] Foreign Application Priority Data

Sep. 28, 1983 [DE] Fed. Rep. of Germany ....... 3335148

[51] Int. Cl.$^4$ ............................................. F16M 13/00
[52] U.S. Cl. ....................................... 248/575; 16/308; 248/598; 267/133; 267/182; 297/304; 297/326; 297/333
[58] Field of Search ............... 248/575, 608, 596, 598, 248/582; 297/333, 332, 326, 304; 16/308; 267/182, 158, 133, 36 A

[56] References Cited

U.S. PATENT DOCUMENTS

| | | | |
|---|---|---|---|
| 3,253,858 | 5/1966 | Degen | 248/417 X |
| 3,598,354 | 8/1971 | Williams | 248/608 X |
| 3,788,586 | 1/1974 | McNally | 248/608 X |
| 4,000,925 | 1/1977 | Doerr et al. | 248/608 X |
| 4,235,408 | 11/1980 | Sapper | 248/608 |

Primary Examiner—J. Franklin Foss
Assistant Examiner—David L. Talbott
Attorney, Agent, or Firm—Learman & McCulloch

[57] ABSTRACT

The invention relates to a device for sprung tilting movement of a component such as an inclining mechanism for a tiltable seat. The spring system is formed by at least one spring rod which is rotatably mounted in at least two bearings of which one bearing is stationary in the operating state while the other bearing is rotatable about an axis spatially offset relative to the axis of the spring rod. This results in a simple, light and space-saving construction.

6 Claims, 5 Drawing Figures

SPRING MOUNTING APPARATUS

The invention relates to a spring mounting device for sprung tilting movement of a component, especially an inclining mechanism for a seat arrangement with a part which can be tilted.

BACKGROUND OF THE INVENTION

Spring inclining mechanisms (tilting devices) for seat arrangements are known in which the spring system is formed by torsion rods. Such constructions are not very reliable in operation since torsion spring rods run a comparatively high risk of breaking.

The state of the art also includes devices in which the spring system of the inclining mechanism is formed by leaf springs. These constructions have the disadvantage that they occupy a comparatively large space and the design is relatively complex.

The object of the invention, therefore, is to provide a device of the type referred to which is simple and light, occupies a small space, and has a high degree of operational reliability.

SUMMARY OF THE INVENTION

In the device according to the invention the spring rod is mounted so as to be rotatable about its axis and is not stressed in torsion, but exclusively in bending. This results in the desired high degree of operational reliability.

The arrangement of the spring rod in two bearings, of which one is stationary in the operating state whilst the other bearing is rotatable about an axis which is spatially offset relative to the axis of the spring rod, facilitates a particularly simple and space-saving connection of the spring rod to the tiltable component: the latter can be connected directly to the rotatable bearing. In this way a very simple, light and space-saving construction is achieved.

The device according to the invention is actually intended in particular as an inclining mechanism for a seat arrangement with a tiltable part. However, it can also be advantageously used for numerous other applications in which a component carries out a spring tilting movement in operation. Thus the device according to the invention is suitable for example for the automatic return of doors, shutters, levers and the like which are deflected out of their rest position against spring tension.

THE DRAWINGS

Several embodiments of the invention are illustrated schematically in the drawings, in which:

FIGS. 1a and 1b an isometric view of a first embodiment of the invention (in the rest position and in the deflected position);

DETAILED DESCRIPTION

Figure 1A:
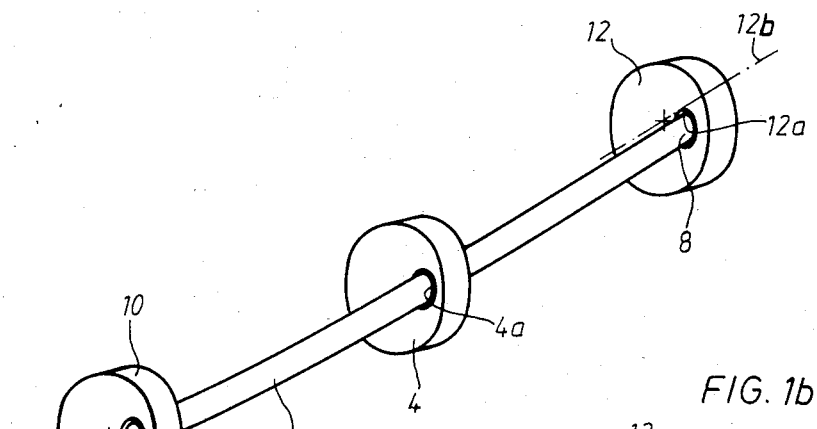

The device illustrated in FIG. 1a comprises a spring rod 2 which is arranged at three points on its length, namely in the region of its centre and at its two ends, in one bearing each 4, 10, 12 respectively, and the spring rod 2 is actually mounted so as to be freely rotatable about its axis in the bearing bores 4a, 10a and 12a. The spring rod 2 can be secured in the usual manner against longitudinal displacement in one of the three bearings.

The central bearing 4 constitutes the support which is stationary in the operating state. The two outer bearings 10 and 12 by contrast are rotatable about their axes 10b and 12b respectively. These axes 10b, 12b of the outer bearings 10, 12 are spatially offset relative to the axis of the spring rod 2. The bearing bores 10a, 12a are thus arranged eccentrically in the outer bearings 10 and 12 which are constructed as round bodies.

Figure 1B:
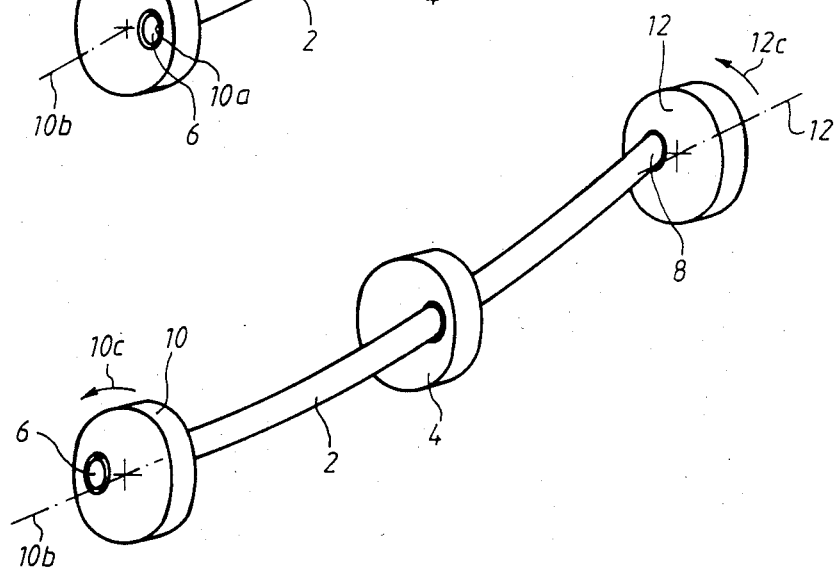

The rotatable outer bearings 10 and 12 are connected to the tiltable component (not shown in FIG. 1). If this component (which can be for example the seat surface or back rest of a seat) carries out a tilting or inclining movement, then the outer bearings 10 and 12 are rocked in the direction of the arrows 10c and 12c respectively. Since the central bearing 4 remains stationary and the spring rod 2 is mounted so as to be freely rotatable in the bearing bores 4a, 10a and 12a, the spring rod 2 undergoes a bending deflection in the manner shown in FIG. 1b. In this way an elastic return force is produced which seeks to return the tiltable component connected to the outer bearings 10 and 12 to its starting position.

From the above description it will be clear that neither the central bearing 4 nor the outer bearings 10 and 12 need to be constructed as round bodies. Thus for example the outer bearings 10 and 12 can also be constructed in the form of simple levers. It is merely essential that these outer bearings 10 and 12 are pivotable about an axis 10b and 12b respectively which is spatially offset relative to the axis of the spring rod 2 and the bearing bores 10a, 12a.

Figure 2A:
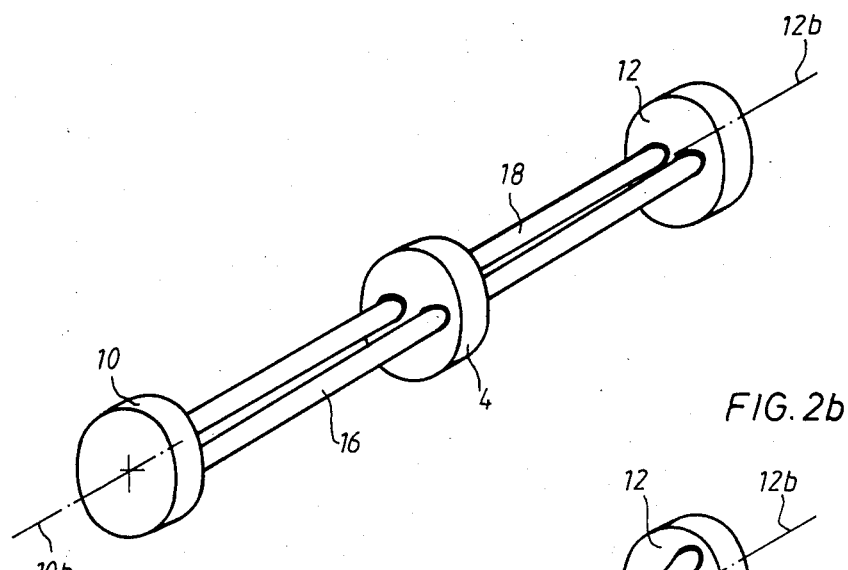
FIGS. 2a and 2b are similar views of a second embodiment of the invention.
Figure 2B:
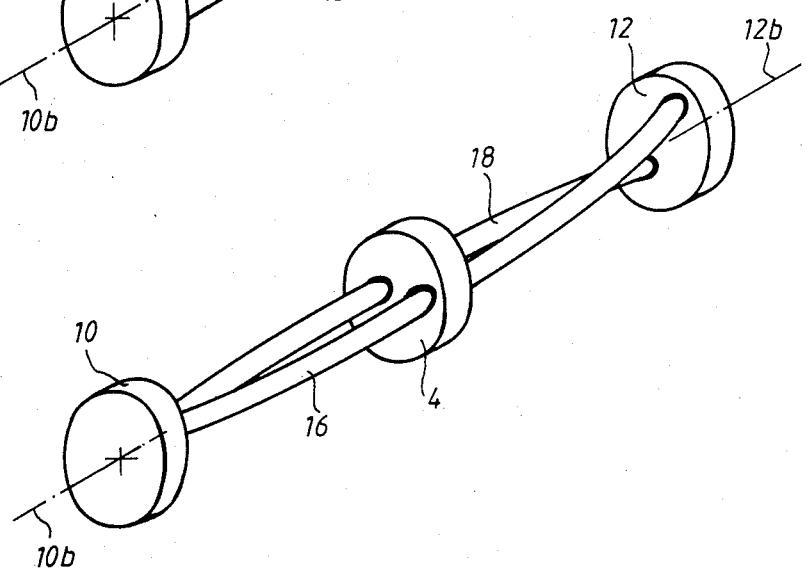

In the further embodiment illustrated in FIG. 2 the spring system is formed by two spring rods 16, 18 which are arranged in the rotatable outer bearings 10 and 12 so as to be symmetrical with the axis of rotation 10b and 12b respectively of these bearings. The springs rods 16 and 18 are also passed symmetrically through the central bearing which is stationary in the operating state.

By using a plurality of spring rods an increase in the elastic return force is achieved in a simple manner without additional space being required. It is apparent that more than two spring rods could be provided if required.

It is also possible within the scope of the invention to vary the number of bearings. In the simplest form one stationary bearing and one rotatable bearing are provided. Apart from the constructions illustrated in FIGS. 1 and 2 with a total of three bearings, variants with a greater number of bearings are also possible.

Figure 3:
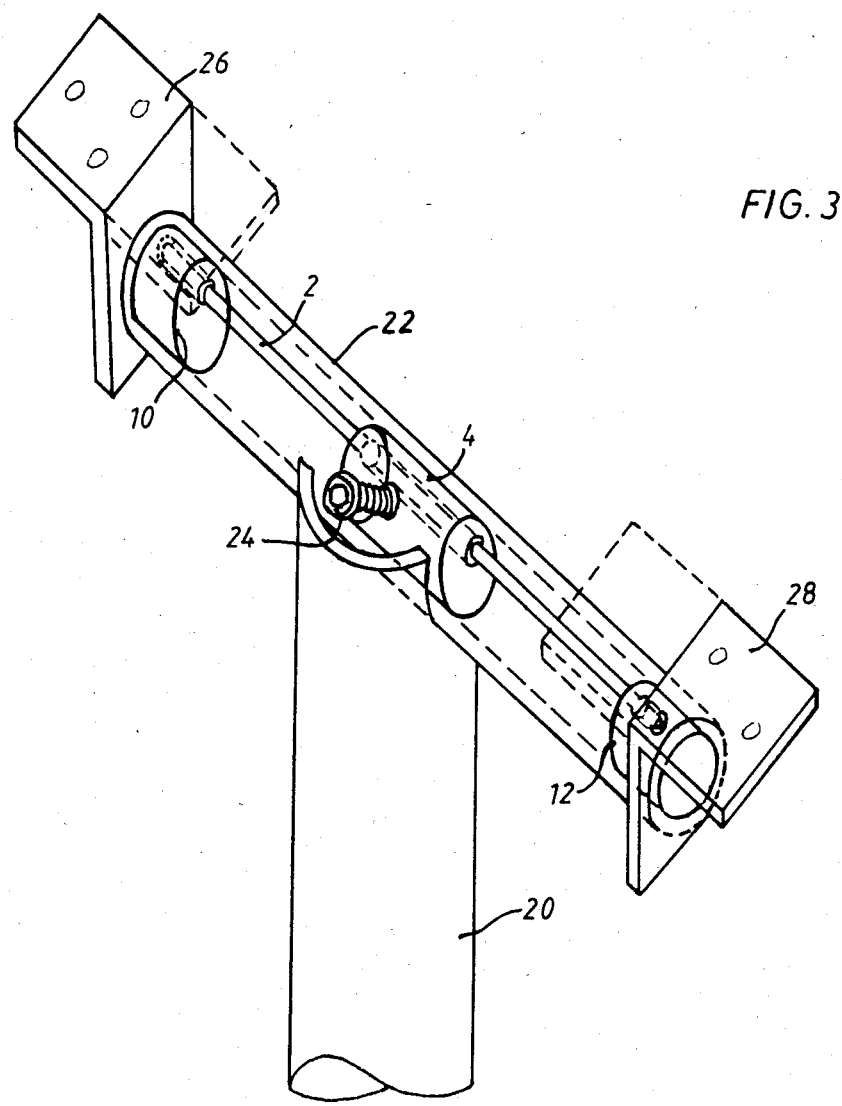
FIG. 3 is a fragmentary isometric view illustrating the application of the invention to a seat.

FIG. 3 illustrates the application of the embodiment according to FIG. 1 to a seat (for example a swivel chair) of which only the central column 20 of the supporting frame is shown. The spring rod 2, the central bearing 4 and the two rotatable outer bearings 10 and 12 are arranged in a cross tube 22 which is fixed to the central column 20. The central bearing 4 is either arranged in the cross tube 22 so as to be fixed against rotation and immovable or—as shown—arranged in the cross tube 22 so as to be movable in the peripheral direction and capable of being fixed in the position shown. A screw 24 is provided in order to move and/or fix the central bearing 4.

Connected to the outer bearings 10 and 12 are angle irons 26, 28 the free sides of which point outwards or (as shown by broken lines) inwards and to which the component to be tilted, e.g. the seat of a swivel chair, is connected.

The use of the screw 24 makes it possible to adjust the initial tension of the elastic system consisting of the spring rod 2, the central bearing 4 and the outer bearings 10 and 12 in the desired manner. This can be achieved for example by constructing the seat surface so that it can be tilted forwards beyond the normal position.

The adjustment of the initial tension can also be achieved for example by using a screw to exert tangential forces on the central bearing 4 in order to rotate this central bearing 4 (relative to the cross tube 22).

The angle of rotation of the bearings 10 and 12 which are connected to the tiltable component can be adjustable, for example by means of stops which are advantageously adjustable.

It is also possible within the scope of the invention to provide for locking of the rotatable bearings in selected angular positions, in the case of a seat arrangement for example in the most forward seat position and in various intermediate positions.

The spring rods used in the device according to the invention can be made from a variety of elastic, fatigue-resistant materials. In addition to spring steel, rods made in particular from resilient plastics and glass fibres could be considered.

A bundle of spring rods, preferably made from glass fibre reinforced polyester, could be used for example.

I claim:

1. Spring mounting apparatus for a pair of relatively tiltable members, said apparatus comprising a pair of spaced apart, coaxial bearings; an intermediate bearing interposed between the bearings of said pair; means mounting the bearings of said pair on one of said members; means mounting the intermediate bearing on the other of said members and coaxially with the bearings of said pair; means restraining the intermediate bearing from rotation; and at least one elongate spring rod spanning all of said bearings and being journaled in at least the intermediate bearing for rotation relative thereto about its own axis, the axis of said rod being spatially offset relative to the axes of said bearings.

2. Apparatus according to claim 1 wherein said rod is journaled in all of said bearings for rotation relative thereto.

3. Apparatus according to claim 1 including at least one other rod parallel to the first-mentioned rod and being similarly associated with all of said bearings, said other rod and said first-mentioned rod being symmetrical about the axes of said bearings.

4. Apparatus according to claim 1 wherein all of said bearings are enclosed within a tube, the bearings of said pair being rotatable relative to said tube and the intermediate bearing being adjustably fixed relative to said tube.

5. Apparatus according to claim 4 including means for rotatably adjusting the position of the intermediate bearing relative to said tube.

6. Apparatus according to claim 1 wherein said rod is constructed from the class of materials consisting of steel, glass fibre, and glass fibre reinforced polyester.

* * * * *